June 14, 1927.　　　　J. G. LINDEMAN　　　　1,632,303
DITCHING MACHINE
Filed April 10, 1926　　　3 Sheets-Sheet 2
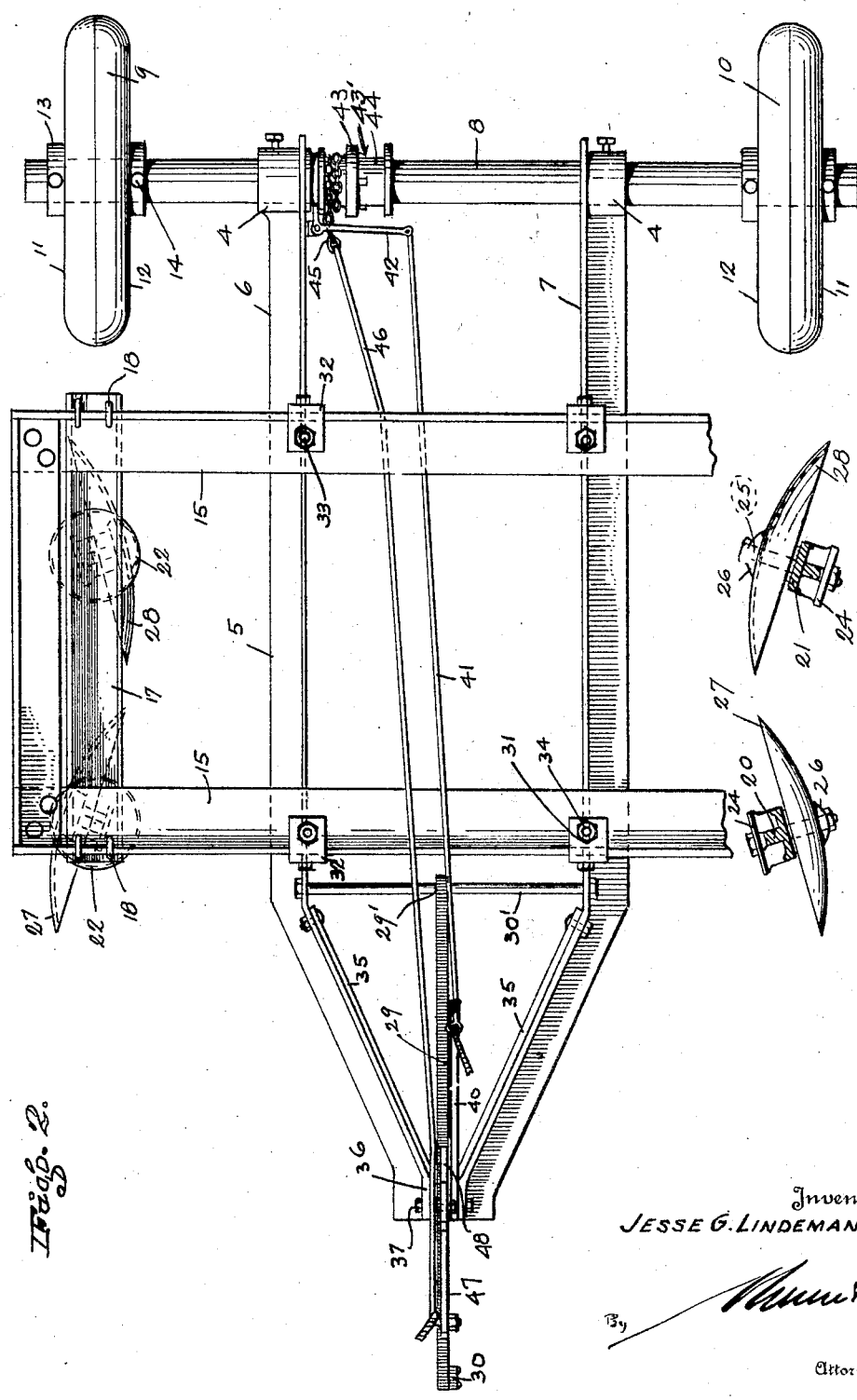
Inventor
JESSE G. LINDEMAN
By
Attorneys

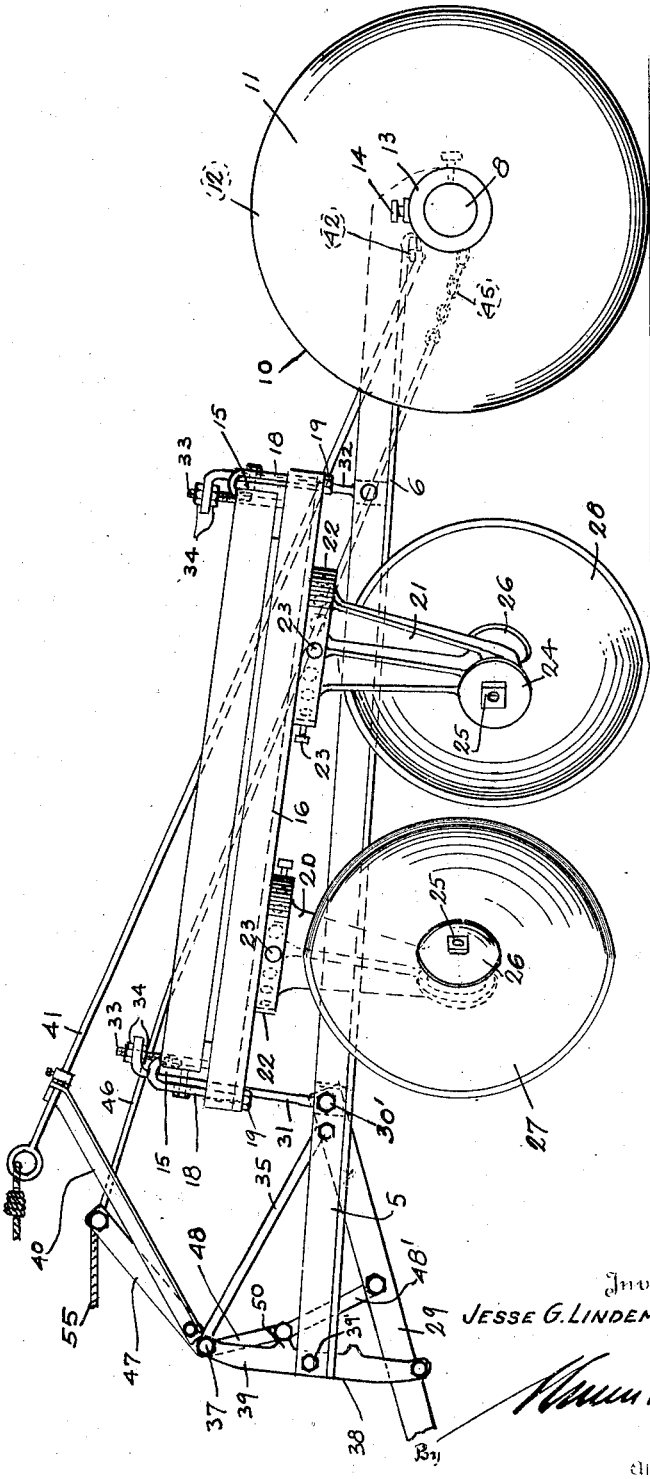

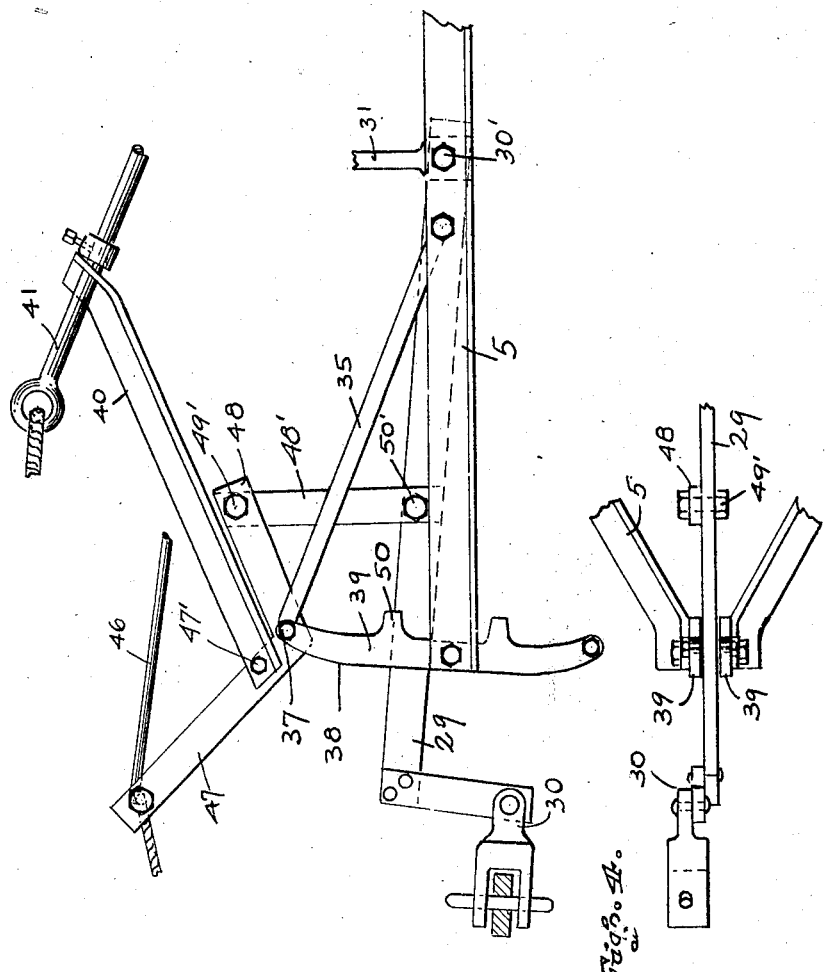

Patented June 14, 1927.

1,632,303

UNITED STATES PATENT OFFICE.

JESSE G. LINDEMAN, OF YAKIMA, WASHINGTON.

DITCHING MACHINE.

Application filed April 10, 1926. Serial No. 101,168.

This invention relates to machines for cutting temporary irrigation ditches in orchards and the like.

The invention proposes to provide means for cutting temporary irrigation ditches of any desired width, depth and distance apart.

A further object of the invention is the provision of a construction in a ditcher adapted for cutting opposite portions of the ground so as to effect the forming of a plurality of ditches simultaneously and, further, to provide for shaping these ditches to required contour immediately succeeding the cutting thereof.

A still further object is the provision of a ditching machine adapted for cutting and shaping a plurality of ditches in one operation and during one trip of the ditcher over the section of the ground in which the ditches are formed.

The above and other objects are accomplished by instrumentalities pointed out in the following specification.

The invention is clearly defined in the claims.

A satisfactory embodiment of the invention is illustrated in the accompanying drawings forming part of the specification and in which Figure 1 is a side elevation of the device showing the main frame and disks tilted upwardly and in operative position;

Figure 2 is a plan view of the device with one end portion of the supplemental frame broken away to disclose the relation of other parts;

Figure 3 is a detail side elevation of the forward end portion of the main frame and a draw bar showing the arrangement of the parts when the main frame is lowered and the disks in engagement with the ground;

Figure 4 is a fragmentary plan view of the forward end of the main frame, also showing the head, the bell crank and bracket being removed for the sake of clearness.

In the drawings 5 indicates a horizontally disposed main frame, the rear end portions of the sides 6 and 7 of which are provided with bearings 4 for the rotatable rear axle 8 to the ends of which are adjustably fitted for lateral adjustment the combined ditch shaping and traction wheels 9 and 10. As shown each of the wheels 9 and 10 is formed of two dished metallic plates 11 and 12 having flanged peripheral portions bearing one upon the other and centrally disposed hubs 13 for the reception of the axle 8, the hubs being provided with radially screw threaded openings for set screws 14 which operate to detachably and adjustably secure the plates of each of the wheels to the axle 8.

15 is a supplemental frame arranged transversely of and superimposed upon main frame 5 and at approximately the central portion thereof. This frame may be of angled metallic strips as shown, or formed of any other material found suitable for the purpose. 16 and 17 indicate plates of channeled iron or its equivalent disposed transversely of the opposite end portions of frame 15 and rigidly secured thereto in any preferred manner as by hook bolts 18 which extend around the upper edge of the supplemental frame and downwardly through the channeled plates 16 and 17 to which they are secured by nuts 19. 20 and 21 indicate hangers depending in pairs from the channeled plates 16, the latter being provided with circular sockets in the form of castings 22 rigidly secured to the plates and adapted for receiving the circular upper ends of the hangers 20 which are adjustably secured within the sockets by clamp screws 23. The lower ends of hangers 20 and 21 are provided with boxings 24 for the reception of the spindles 25 which extend through and form bearings for the hubs 26 of the cutting disks 27 and 28. As will be noted by reference to the drawings, the channeled plates 16 and 17 are in alinement with the wheels 9 and 10 and the hangers 20 and 21 are so adjusted that the forward disks 27 are arranged with their concave faces presented inwardly while the rear disks 28 are disposed with their concave faces presented outwardly. The adjustable connection between the hangers and channeled plates 16 and 17 permits of arranging the disks 20 and 21 on each side with their faces in any desired angular relation. The peculiar arrangement of disks at either end of the supplemental frame 15 provides for the cutting of substantially V-shaped ditches and in the cutting of a ditch by the disks on one end portion of the supplemental frame, the soil is lifted and thrown outwardly in opposite directions and the width of the ditch is determined by the angle included between the axes of the disks.

The entering of the wheels 9 and 10 into the ditches as these are cut by the disks, operates to shape the ditches to conform to the peripheral contours of the wheels. The connection between the channeled plates 16 and 17 and the supplemental frame 15 permits of adjusting either or both sets of disks to various distances from the longitudinal central line of the main frame 5, and the adjustment permitted by the connection between the wheels 9 and 10 and the axle 8, enables the device of the present invention to form a plurality of ditches spaced for any required distance apart.

The forward end portions of the sides 6 and 7 of the frame converge and are disposed upon opposite sides of a draw bar 29 which is pivoted as at 29' to a cross bar 30' connected to the frame 5. The draw bar is provided with a clevis 30 adapted for connection to a draft appliance, such as a tractor, not shown.

Upstanding brackets 31 and 32 are rigidly secured to the side members 6 and 7 of the main frame, the upper end portions of these brackets overhanging the forward side of supplemental frame 15. Bolts 33 secured to frame 15 pass through openings in the overhanging portions of the brackets and are surmounted by adjusting nuts 34. By turning the nuts 34 upon the bolts 33, the supplemental frame 15 is adjusted vertically with respect to the main frame 5 so that when the latter is connected to the draft appliance, the frame 15 may be adjusted vertically to regulate the depth of cut on the part of the disks 27 and 28. In this way the device of this invention is enabled to cut ditches of any desired depth.

35 is a bracket sloping upwardly and forwardly from the forward end portion of the main frame 5, its forward end overlying draw bar 29. The sides 36 of the bracket 35 converge forwardly and are secured, as by a pin 37, to the upper end of a vertically disposed head 38 herein shown as made up of a pair of oppositely disposed side members 39 spaced for the reception of draw bar 29.

40 is a bracket arm extending upwardly and rearwardly from a bell crank 47, to which it is pivotally connected as at 47'. A pull rod 41 extends downwardly and rearwardly through an opening in the upper end portion of arm 40 to a lever 42 which operates a drum 43 slidable upon axle 8 to move axially thereof. Pins 43' on the drum engage in openings in a disk 44 fixedly secured to axle 8 when the drum is operated to slide in one direction. The disk then acts to effect rotation of the drum in the turning of shaft 8. The drum has attached thereto one end of a flexible element 45 which is connected by a pull rod or its equivalent 46 to one arm of bellcrank lever 47 which is fulcrumed at the upper end of head 38 and upon the pin 37 passing through the head. The other arm 48 of the bellcrank is pivotally connected, as at 49', to one end of a link 48', the opposite end of which is pivotally connected as at 50' to the draw bar 29. When drum 43 rotates, flexible element 45 is wound thereon and pull rod 46 operated to rock bellcrank lever 47 from the position shown in Figure 3 to the position shown in Figure 1. In this movement of the bell crank arm 48 thereof moves downwardly and forwardly, whereupon the forward end of the main frame is tilted upwardly, the said frame turning upon the bearings 4, and moving until the head of pivot pin 49' abuts a stop 50 upon head 39. At this time the disks 27 and 28 are elevated above the ground so that the ditcher may be conveniently turned upon traction wheels 9 and 10. In moving rearwardly the upper arm of bell crank 47 carries bracket arm 40 rearwardly. The outer end of the bracket arm bears upon an adjustable stop upon pull rod 41, so that the rod 41 is caused to move by the bracket and thereby operate lever 42 to disengage the drum 43 from disk 44. At this time the parts occupy the positions shown in Figure 1, where it will be noted that the main frame is locked against downward movement. In this connection, it is to be observed that the construction and arrangement of bell crank 47, link 48' and stop 50 are such that when head of pivot pin 49' abuts stop 50, pin 49' is disposed forwardly and beyond the centers of pins 47' and 50'. In order to unlock the parts and permit the disks to descend into operative position, the upper arm of bell crank 47 is pulled forwardly by a rope 55 connected to the bell crank and accessible to the operator of the draft vehicle.

In the use of the device the forward disks are adjusted so as to penetrate the ground to a less extent than the rear disks so that in moving over the ground the forward disks cut the ditch or furrow to approximately one half the required depth and move the soil outwardly in one direction. The rear disks then entering the furrow move the soil therefrom in the opposite direction and effect the deepening of the ditch to the required extent.

Although I have shown and described one embodiment of my invention, it is to be understood that the same is susceptible of various changes; and I reserve the right to employ such as may come within the scope of the appended claims.

I claim:

1. A ditch digging machine comprising a main frame having bearings, an axle rotatably mounted in said bearings, ground wheels adjustable axially of the axle, a supplemental frame disposed transversely of the main frame and adjustable vertically thereon, supports adjustably connected to the supplemental frame and movable into alinement with the ground wheels, hangers depending from said supports and adjustably connected thereto and ground cutting disks rotatably mounted upon the hangers and adjustable therewith, said disks being concavo-convex in cross section and disposed in pairs at the opposite end portions of the supplemental frame, the disks of each pair being further arranged with their respective concave faces presented outwardly and inwardly with respect to the main frame for the purpose described.

2. In a ditch digging machine, a main frame, a draw bar pivotally connected to one end portion of the main frame and adapted to be connected to a draft device, an axle disposed at the opposite end portion of the main frame and rotatable thereon, ground wheels carried by the axle, a lever fulcrumed upon the main frame between the connectible end of the draw bar and the axle, said lever being connected to the draw bar, a drum loose upon the axle, a flexible element connected to the drum and to the lever, and means rotatable with the axle and adapted to engage the drum and thereby rotate the same in the turning of the axle whereby the flexible element is wound upon the drum and the lever moved in one direction to tilt the frame upwardly.

3. A ditch digging machine comprising a main frame having bearings, an axle rotatably mounted in said bearings, ground wheels adjustable axially of the axle, a supplemental frame disposed transversely of the main frame and adjustable vertically thereon, supports adjustably connected to the supplemental frame and movable into alinement with the ground wheels, hangers depending from said supports and adjustably connected thereto and ground cutting disks rotatably mounted upon the hangers and adjustable therewith, said disks being concavo-convex in cross section and disposed in pairs at the opposite end portions of the supplemental frame, the disks of each pair being further arranged with their respective concave faces presented outwardly and inwardly with respect to the main frame for the purpose described, the wheels supporting said main frame trailing, and being in alinement, with said disks and the peripheries of said wheels being arcuate and of a size to enter the ditch made by said disks.

4. A ditch digging machine comprising a main frame having bearings, an axle rotatably mounted in said bearings, ground wheels adjustable axially of the axle, a supplemental frame disposed transversely of the main frame and adjustable vertically thereon, supports adjustably connected to the supplemental frame and movable into alinement with the ground wheels, hangers depending from said supports and adjustably connected thereto and ground cutting disks rotatably mounted upon the hangers and adjustable therewith, said disks being concavo-convex in cross section and disposed in pairs at the opposite end portions of the supplemental frame, the disks of each pair being further arranged with their respective concave faces presented outwardly and inwardly with respect to the main frame for the purpose described, the forward disks being adjusted to penetrate the ground to a lesser depth than rear disks.

JESSE G. LINDEMAN.